Dec. 20, 1927. 1,653,418
I. SORGIUS
AUTOMOBILE DASH LAMP
Filed March 23, 1927
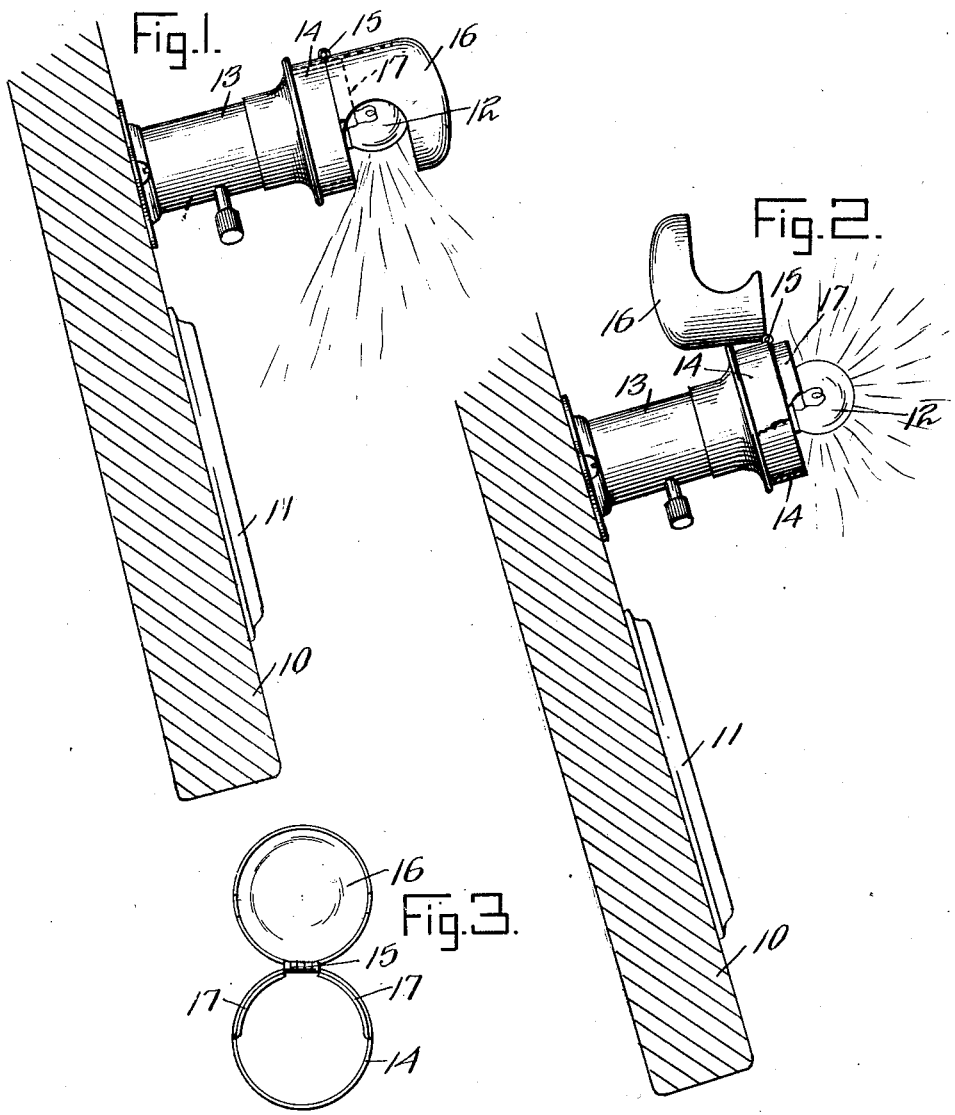
Inventor
Isaac Sorgius
By
Attorney Patented Dec. 20, 1927.

1,653,418

UNITED STATES PATENT OFFICE.

ISAAC SORGIUS, OF INDIANAPOLIS, INDIANA.

AUTOMOBILE DASH LAMP.

Application filed March 23, 1927. Serial No. 177,739.

My present invention relates to a light shield or hood for a lamp adapted to be mounted on the instrument board of an automobile for illuminating the various instrumentalities thereon and it is an object of the invention to provide a hood or shield having a pivotally mounted portion capable of being swung from a normal substantially horizontal position for screening the light from the eyes of the driver upwardly so that the front portion of the automobile may be illuminated.

Referring to the accompanying drawing, which is made a part hereof and on which similar reference characters indicate similar parts:

Figure 1 is a side elevation illustrating one application of my invention.

Figure 2 a similar view with the hood or light shield raised, and

Figure 3 a view of the invention taken at right angles to Figure 2.

In the drawings, reference character 10 indicates the instrument board of an automobile having an ammeter 11 and other instruments (not shown) thereon adapted to be illuminated by an electric lamp 12 supported in a lamp socket 13. The above parts are all of conventional construction and constitute no part of my invention. In order to shield the eyes of the operator of the vehicle from the blinding glare of the lamp 12 which would prevent a clear vision of the roadway, a detachable shield or hood is preferably provided and in the present instance comprises a base ring or support 14 to which is hinged at 15 a substantially cup-shaped hood or shield 16. The hood or shield 16 is adapted to be held in a substantially horizontal position as shown in Figure 1 for confining the light supplied by the lamp 12 and for causing it to shine downwardly on the instrument board, or it may be raised to permit the light to shine unobstructed over the front part of the car. The support or base ring 14 is preferably provided with an inwardly offset flange 17 for maintaining the hood or screen in proper position when it is in the position for confining the light, as shown in Figure 1.

It will be obvious to those skilled in the art that various changes may be made in my device without departing from the spirit of my invention, and I, therefore, do not limit myself to what is shown in the drawings and described in the specification, but only as set forth in the appended claims.

Having thus described my invention, what I claim as new and desire to secure by Letters Patent is:

1. A device of the class described, comprising a pair of pivotally connected sections, one of said sections having a cut-out portion forming with the side of the other section a slot, and an offset flange formed on one of the sections for supporting the other section in a predetermined position, substantially as set forth.

2. A lamp for a dash light comprising a supporting frame, a lamp, said frame being adapted to frictionally engage said lamp, a hood or deflector hinged to said supporting frame and adapted to cover the lamp, said hood having a cut out portion in its lower side and forming with the side of the other section when supported in its normal position on the dash a slot through which light is adapted to be deflected downwardly, said hood being adapted to be moved out of a position for shielding the lamp, whereby the light is permitted to shine freely from the lamp, substantially as set forth.

3. The combination with an automobile dash of a lamp socket for receiving an electric lamp, a supporting ring for frictionally engaging the lamp socket but permitting the light to shine laterally unobstructed, and a hood member pivoted to said supporting means behind the light-shedding portion of the lamp and swingable from a light-confining position over the lamp to a position to permit light to shine freely on all sides, said hood member having a cut-out portion forming with the side of the supporting ring a slot through which light may shine, substantially as set forth.

In witness whereof, I have hereunto set my hand at Indianapolis, Indiana this 19th day of March, A. D. nineteen hundred and twenty-seven.

ISAAC SORGIUS.